United States Patent [19]

Anderson et al.

[11] Patent Number: 5,109,402
[45] Date of Patent: Apr. 28, 1992

[54] BUS FOR A CELLULAR TELEPHONE

[75] Inventors: Gregory D. Anderson; Dusty Keashly, both of Calgary, Canada

[73] Assignee: Novatel Communications, Ltd., Calgary, Canada

[21] Appl. No.: 579,289

[22] Filed: Sep. 4, 1990

Related U.S. Application Data

[63] Continuation of Ser. No. 406,838, Sep. 13, 1989, abandoned, which is a continuation of Ser. No. 303,102, Jan. 25, 1989, abandoned, which is a continuation of Ser. No. 35,788, Apr. 8, 1987, abandoned.

[51] Int. Cl.⁵ .................................................. H04M 11/00
[52] U.S. Cl. ........................................ 379/58; 379/63; 379/165
[58] Field of Search ................ 379/59, 60, 62, 63, 379/165, 58

[56] References Cited

U.S. PATENT DOCUMENTS 3,201,522  8/1965  Ozenberger .......................... 379/58
4,122,304  10/1978  Mallien, II .......................... 379/63
4,392,243  7/1983  Ohhashi et al. ...................... 379/58

OTHER PUBLICATIONS

Levy, John V., "Buses, The Skeleton of Computer Structures", in Bell, C. Gordon, Mudge, J. Craig, and McNamara, John E., eds.

Thurber, Kenneth J. et al., "A Systematic Approach to the Design of Digital Busses Structures", 1972, Fall Joint Computer Conference.

Primary Examiner—James L. Dwyer
Assistant Examiner—M. Shehata
Attorney, Agent, or Firm—Cesari and McKenna

[57] ABSTRACT

An apparatus for interconnecting a cellular telephone transceiver and a plurality of peripheral devices, such as handsets or speakerphones, is disclosed. The apparatus provides a bus-type interconnection in which multiple peripheral devices may connect with a single transceiver, and the flow of information from the peripheral devices to the transceiver is regulated in accordance with a protocol.

10 Claims, 4 Drawing Sheets

BUS FOR A CELLULAR TELEPHONE

This is a continuation of Ser. No. 07/406.838, filed Sep. 13, 1989 now abandoned, which is a continuation of Ser. No. 07/303,102, filed Jan. 25, 1989 now abandoned, which is a continuation of Ser. No. 07/035,788, filed Apr. 8, 1987 now abandoned.

BACKGROUND OF THE INVENTION

1. Field of the Invention

This invention generally relates to the field of cellular (radio) telephones and, more specifically, to an interconnection device for connecting two cellular telephone components.

2. Discussion of the Prior Art

A mobile cellular telephone system consists of several components including an antenna, a transceiver and a peripheral device, such as a handset. The handset is connected to the transceiver and may be operated by a user in much the same way as a conventional telephone handset. Several types of information are exchanged between the transceiver and handset including audio signals, data, and commands. There are fundamental differences, however, between the information types. For example, the audio signals are typically analog while the data and commands are in digital form. In addition, the digital information may be transmitted at different speeds depending on the type of information or the source. Thus, the interconnection between the transceiver and the handset, or between other components of the system which must exchange similar types of information, must accommodate all of the information types and their respective characteristics.

One type of interconnection known in the prior art is a so-called "star" connection. The star connection includes a multi-wire cable which extends from the transceiver to a junction box. The junction box typically provides a connection point for a single peripheral device.

The major disadvantage of the star-type connection is that it is not "open ended". In other words, a transceiver which has a single star-type connection can only be connected to one peripheral device at a time, which severely limits a user's ability to configure a system to meet the requirements of a specific application.

SUMMARY OF THE INVENTION

The present invention provides a bus-type interconnection for a cellular telephone system. The interconnection may be used to connect a number of components including transceivers, bus controllers and peripheral devices.

The interconnection comprises a plurality of paths which provide for the passage of audio signals, information, and a control signal between two components. The control signal regulates the flow of information from both the bus controllers and the peripheral devices to the transceiver.

Each component which is connected to the interconnection is interchangeable with any like component in the system. As a result, a user may quickly and easily interchange or substitute components and thereby reconfigure the system to meet the needs of a particular application.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
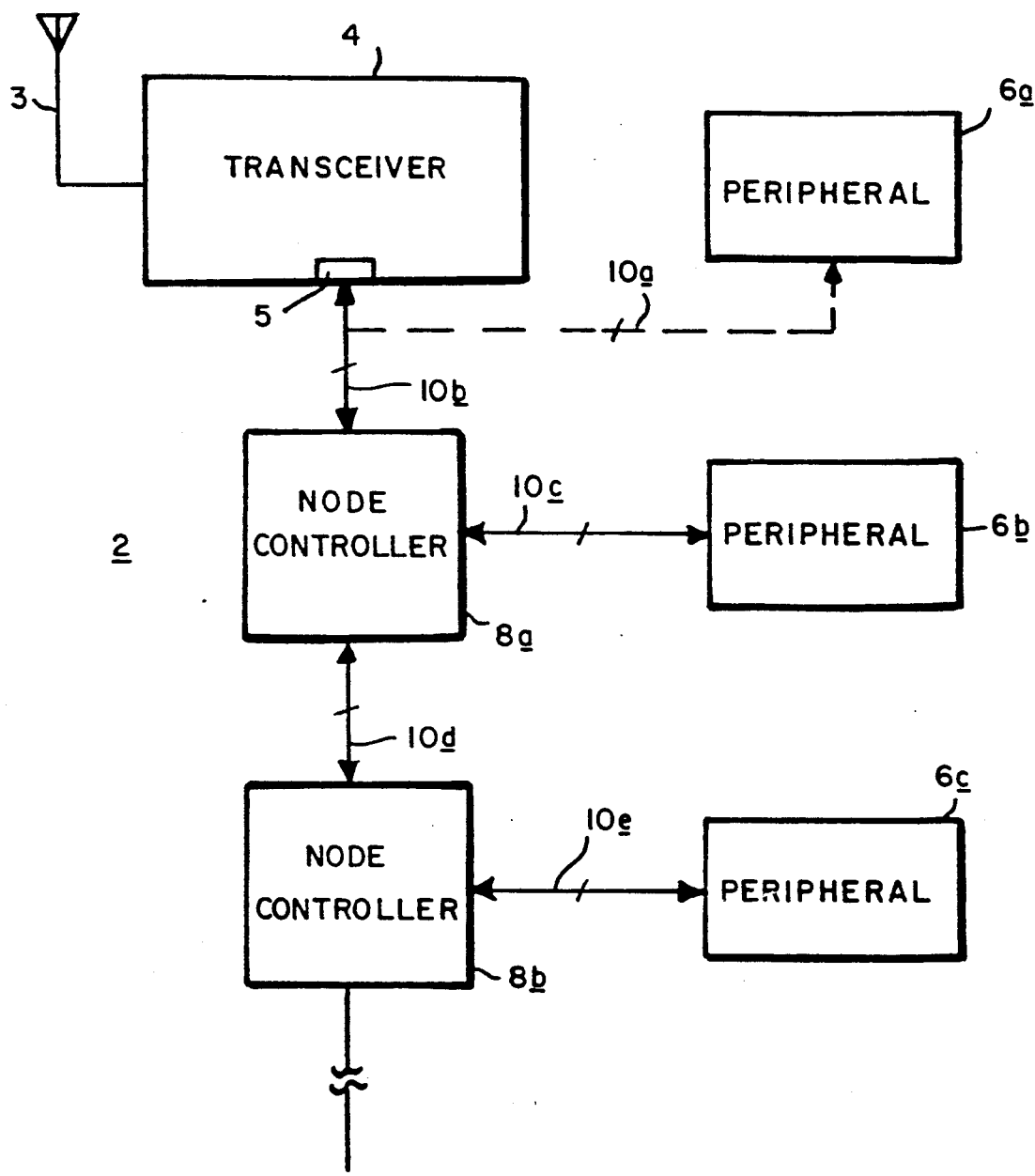
FIG. 1 is a block diagram of a cellular telephone system which includes an interconnection apparatus constructed in accordance with the preferred embodiment of the present invention.

FIG. 1 is a block diagram of a cellular telephone system 2. A cellular telephone transceiver 4 is connected to an antenna 3. The transceiver 4 includes a single input 5. A peripheral device 6a may be connected directly to the input 5 by a bus interconnection 10a shown in dashed lines. Alternatively, a first node controller 8a may be connected to the input 5 by an interconnection 10b. A peripheral device 6b is then connected to the node controller 8a by an interconnection 10c. Similarly, a second node controller 8b is connected to the first node controller 8a by an interconnection 10d. A peripheral device 6c is connected to the second node controller 8b by an interconnection 10e.

Each of the peripheral devices 6a, 6b and 6c may comprise, for example, a standard cellular telephone handset, a so-called "hands-free" or speakerphone unit, a "compact control unit" or other device by which a user may converse with another party. Each of the interconnections 10a–10e comprises a plurality of paths by which audio signals, information and control signals are passed. In general, all of the interconnections 10a–10e are identical. As a result, like components within the system 2 may be rearranged to meet the requirements of a particular application. For example, any one of the peripheral devices 6a–6c may be interchanged with or substituted for either of the other two peripheral devices. One or more additional node controllers (not shown) may also be successively connected to the node controller 8b, thereby providing additional connection points for other peripheral devices. In addition, the transceiver 4 may include additional inputs (not shown) which are similar to the input 5, thereby providing additional connection point for a single peripheral device or one or more node controllers.

Figure 2:
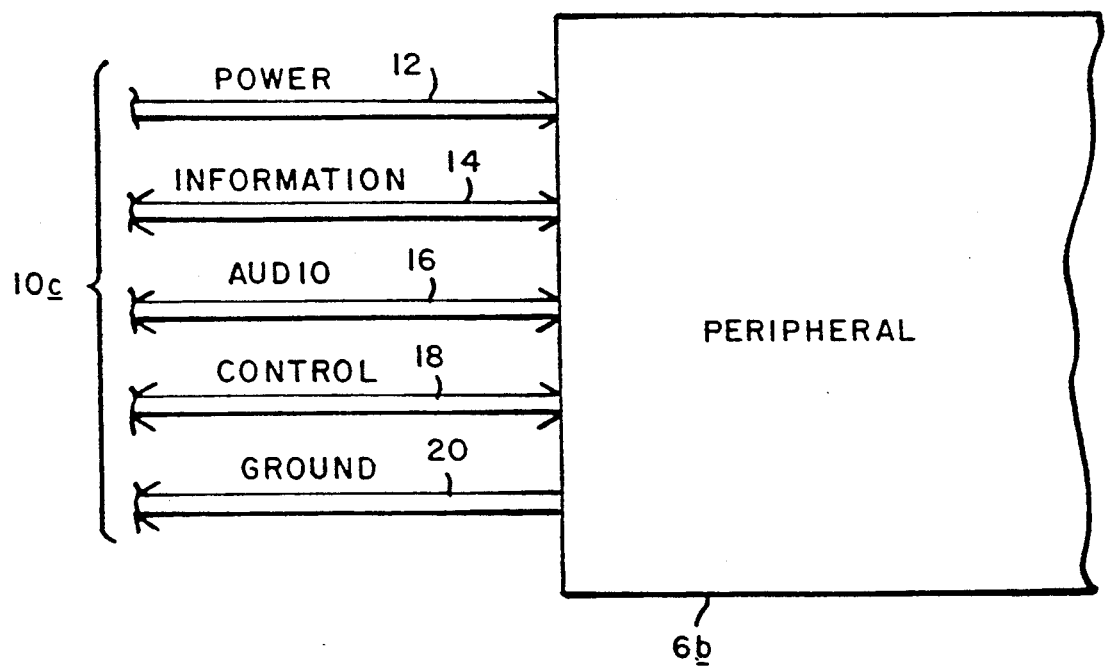
FIG. 2 is a more detailed diagram of a peripheral device connected to the interconnection apparatus shown in FIG. 1.

FIG. 2 is a more detailed diagram of the peripheral device 6b and the interconnection 10c shown in FIG. 1. The interconnection 10c comprises a path 12 by which power is supplied to the peripheral device 6b from the transceiver 4 (FIG. 1). An information path 14 provides for bidirectional passage of information, which may contain both data and commands. An audio signal path 16 provides for bidirectional passage of audio signals including voice, dual tone multifrequency (DTMF) tones and information tones. A control signal path 18 provides for bidirectional passage of a control signal which regulates the passage of information through the information path 14. Finally, a path 20 provides a return to ground potential for the peripheral device 6b.

Figure 3:
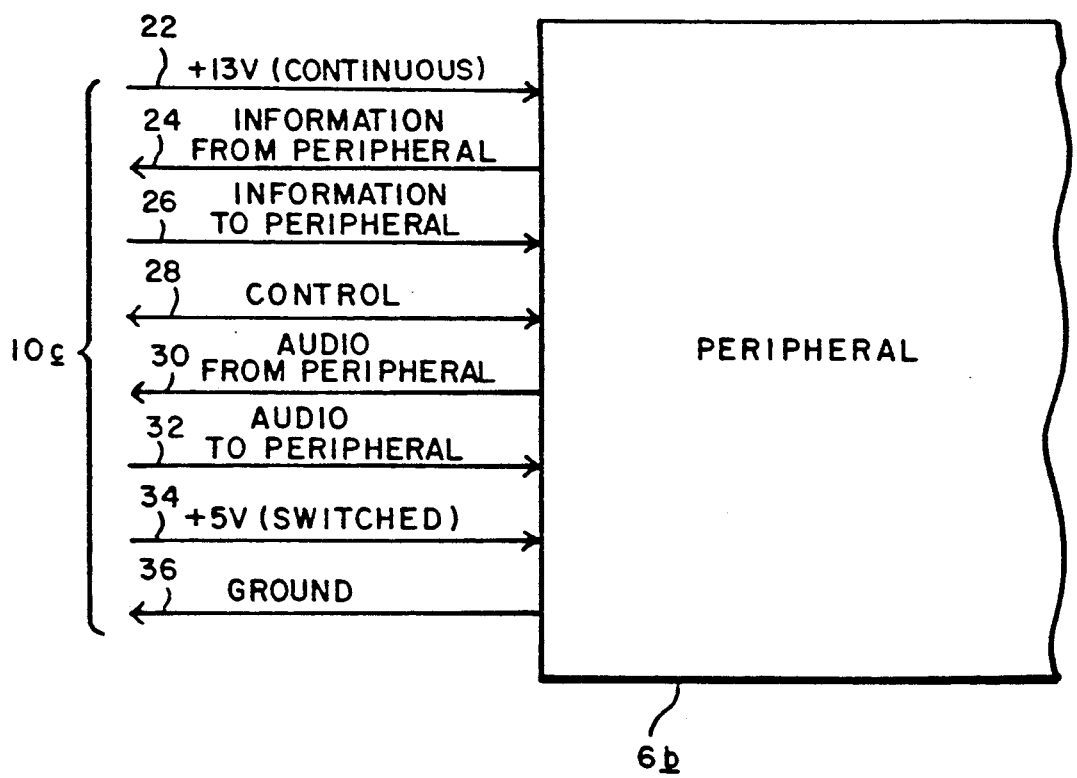
FIG. 3 is a more detailed diagram of the interconnection apparatus shown in FIG. 2.

FIG. 3 depicts a specific implementation of the interconnection 10c shown in FIGS. 1 and 2. A line 22 provides a source of supply voltage to the peripheral device 6b. A line 24 carries information transmitted from the peripheral device 6b while a line 26 carries information transmitted to the peripheral device. A line 28 carries a control signal for regulating the passage of information through the line 24. A line 30 carries audio signals transmitted from the peripheral device 6b while a line 32 carries audio signals transmitted to the peripheral device. A line 34 provides a source of supply voltage to the node controller (FIG. 1) and a line 36 provides a return to ground potential.

The detailed operation of the interconnection 10c may be understood with reference to both FIGS. 1 and 3. First, both of the lines 30 and 32 operate to pass audio signals in only one direction. Thus, it is possible for the peripheral device 6b to both transmit and receive audio signals simultaneously.

Second, information which is transmitted by the transceiver 4 to the peripheral device 6b is freely passed to the peripheral device at all times via the line 26. In other words, the transceiver 4 has access to the line 26 at all times and therefore transmits information to all of the peripheral devices simultaneously. In contrast, before a peripheral device can transmit information to the transceiver 4, that peripheral device must first request access to the line 24 and that request must be granted by the transceiver 4. The sequence of steps by which a peripheral device requests to send information is discussed in more detail below in connection with FIG. 4. In this manner, the transceiver 4 may arbitrate access to the line 24 when multiple peripheral devices are ready to transmit information.

The information carried by the lines 24 and 26 is preferably in digital form and is preferably transmitted in an asynchronous serial format.

Figure 4:
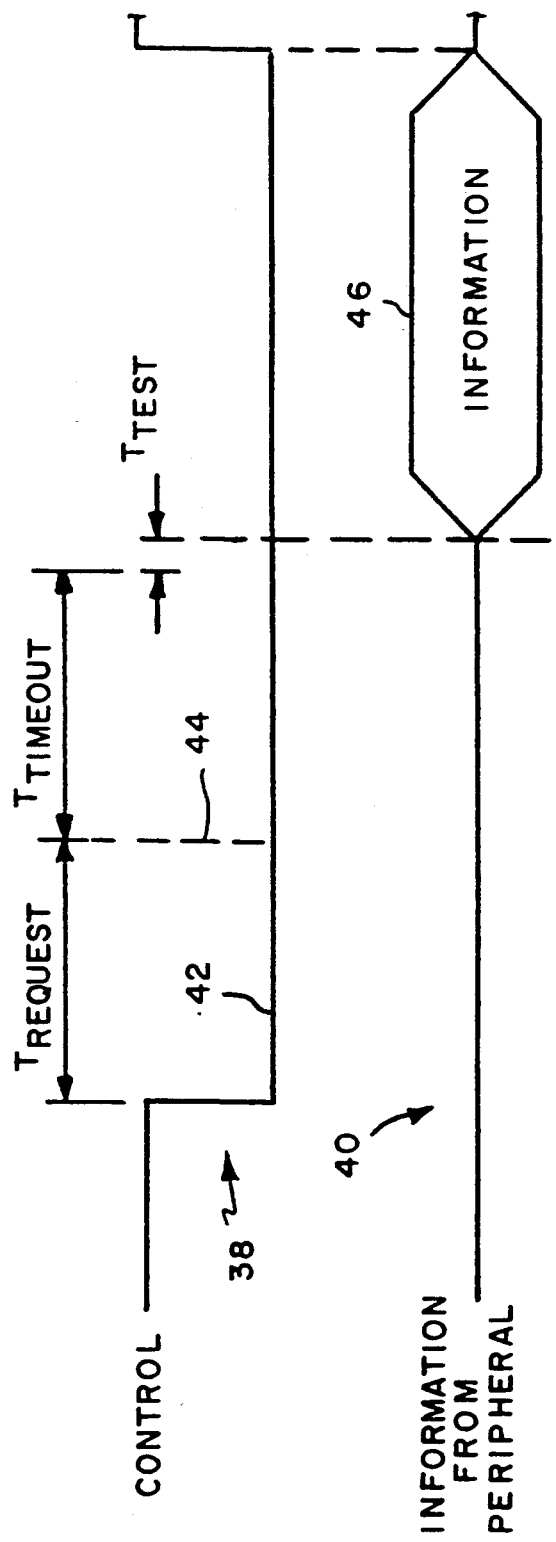
FIG. 4 is a timing diagram showing a series of steps by which a peripheral device may pass information to a transceiver.

FIG. 4 is a timing diagram which depicts a series of steps by which a peripheral device may transmit information to a transceiver. Referring now to both FIGS. 1, 3 and 4, a digital control signal 38 is carried by the line 28 and an information signal 40 is carried by the line 24. When the peripheral device 6b is ready to transmit information to the transceiver 4, the peripheral device forces the control signal 38 to a predetermined logical state for a predetermined period of time $T_{request}$. Following the expiration of the predetermined period, the peripheral device 6b "releases" the control signal 38 and thereby permits it to fluctuate for a predetermined period of time $T_{timeout}$. At the expiration of the timeout period, the peripheral device 6b senses the logical state of the control signal 38 for a predetermined period of time $T_{test}$. If the control signal 38 is still in the predetermined logical state 42, then the peripheral device 6b is free to transmit its information 46 to the transceiver. Once the transmission of the information is complete, the peripheral device 6b releases the control signal 38, which may then return to its original logical state.

The control signal and information signal shown in FIG. 4 may be generated by conventional digital circuitry. The design of such circuitry is well within the capability of someone having ordinary skill in the art of digital circuit design.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A cellular telephone system, said system comprising:
   A. a cellular telephone transceiver;
   B. one or more peripheral devices; and
   C. system interconnection means for connecting the transceiver to each of the peripheral devices, the system interconnection means including:
      i. audio signal interconnection means for passing an audio signal between the transceiver and the peripheral devices,
      ii. information signal interconnection means for passing an information signal between the transceiver and the peripheral devices,
      iii. control signal interconnection means for passing a control signal between the transceiver and the peripheral devices, the control signal including at least first and second portions, the first portion comprising a first predetermined logical state which exists for a first predetermined period of time for indicating that a peripheral device is ready to transmit information to the transceiver through the information signal interconnection means, and the second portion for indicating whether the transceiver is ready to receive information from a peripheral device.

2. The system of claim 1 wherein the second portion of the control signal comprises either the first predetermined logical state or a second predetermined logical state which exists for a second predetermined period of time following the expiration of the first predetermined period of time.

3. The system as in claim 2 wherein the control signal includes a third portion which comprises the first predetermined logical state which exists for a third predetermined period of time, following the expiration of the second predetermined period of time, during which information may be transmitted from a peripheral device to the transceiver.

4. A cellular telephone transceiver, said transceiver comprising:
   A. audio signal interconnection means for passing audio signals between the transceiver and one or more peripheral devices;
   B. information signal interconnection means for passing information signals between the transceiver and one or more peripheral devices; and
   C. control signal interconnection means for receiving a control signal from or transmitting a control signal to one or more peripheral devices, the control signal including at least first and second portions, the first portion comprising a first predetermined logical state which exists for a first predetermined period of time for indicating that a peripheral device is ready to transmit information to the transceiver through the information signal interconnection means, and the second portion for indicating whether the transceiver is ready to receive information from a peripheral device.

5. The transceiver as in claim 4 wherein the second portion of the control signal comprises either the first predetermined logical state or a second predetermined logical state which exists for a second predetermined period of time following the expiration of the first predetermined period of time.

6. The transceiver as in claim 5 wherein the control signal includes a third portion which comprises the first predetermined logical state which exists for a third predetermined period of time, following the expiration of the second predetermined period of time, during which information may be transmitted from a peripheral device to the transceiver.

7. A peripheral device for use with a cellular telephone transceiver, said device comprising:
   A. audio signal interconnection means for passing audio signals between the peripheral device and a cellular telephone transceiver;
   B. information signal interconnection means for passing information signals between the peripheral device and the transceiver; and
   C. control signal interconnection means for passing a control signal between the peripheral device and the transceiver, the control signal including at least first and second portions, the first portion comprising a first predetermined logical state which exists for a first predetermined period of time for indicating that the peripheral device is ready to transmit information to the transceiver through the information signal interconnection means, and the second portion for indicating whether the transceiver is ready to receive information from the peripheral device.

8. The peripheral device as in claim 7 wherein the second portion of the control signal comprises either the first predetermined logical state or a second predetermined logical state which exists for a second predetermined period of time following the expiration of the first predetermined period of time.

9. The peripheral device as in claim 8 wherein the control signal includes a third portion which comprises the first predetermined logical state which exists for a third predetermined period of time, following the expiration of the second predetermined period of time, during which information may be transmitted from the peripheral device to the transceiver.

10. The peripheral device as in claim 8 wherein the second predetermined logical state indicates that the transceiver is not ready to receive information from the peripheral device.

* * * * *